(12) United States Patent
Fujinaga

(10) Patent No.: US 6,904,235 B2
(45) Date of Patent: *Jun. 7, 2005

(54) QUANTITY-OF-LIGHT ADJUSTING DEVICE

(75) Inventor: Nobuhiro Fujinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/909,406

(22) Filed: Aug. 3, 2004

(65) Prior Publication Data

US 2005/0002667 A1 Jan. 6, 2005

Related U.S. Application Data

(62) Division of application No. 10/606,311, filed on Jun. 26, 2003, now Pat. No. 6,853,810.

(30) Foreign Application Priority Data

Jul. 10, 2002 (JP) .................................. 2002-200994

(51) Int. Cl.$^7$ ............................................. G03B 7/099
(52) U.S. Cl. ...................................... 396/269; 396/451
(58) Field of Search ................................. 396/269, 449, 396/451, 493

(56) References Cited

U.S. PATENT DOCUMENTS

| 5,043,753 A | 8/1991 | Nakamori | 396/449 |
| 6,072,958 A | 6/2000 | Hasuda | 396/235 |
| 6,374,049 B1 | 4/2002 | Fujinaga | 396/55 |

FOREIGN PATENT DOCUMENTS

| JP | 6-281995 | 10/1994 |
| JP | 2627168 | 4/1997 |
| JP | 2909629 | 4/1999 |
| JP | 2001-42382 | 2/2001 |

*Primary Examiner*—David M. Gray
(74) *Attorney, Agent, or Firm*—Fitzpatrick, Cella, Harper & Scinto

(57) ABSTRACT

A quantity-of-light adjusting device comprises a first quantity-of-light adjusting blade and a second quantity-of-light adjusting blade which move to adjust quantity of light, and a detecting member which detects that the first quality-of-light adjusting blade is at a predetermined location while also detecting that the second quantity-of-light adjusting member has moved to the predetermined location following the first quantity-of-light adjusting blade moving from the predetermined location, so that the state of adjusting of the aperture with the quantity-of-light adjusting means can be detected by a single detecting member.

3 Claims, 5 Drawing Sheets

(A : CLOSED STATE)

(A : CLOSED STATE)

(B : PINHOLE STATE)

(C : FULLY OPEN STATE)

ically, various types of devices having iris blades or shutter blades or the like for adjusting the quantity of light so that the exposure on a recording medium such as film or a CCD is a suitable level have been proposed, and many

QUANTITY-OF-LIGHT ADJUSTING DEVICE

CROSS REFERENCE TO RELATED APPLICATION

This application is a division of application Ser. No. 10/606,311 filed Jun. 26, 2003, now U.S. Pat. No. 6,853,810 the entire disclosure of which is hereby incorporated by reference.

BACKGROUND OF THE INVENTION

1. Field of the Invention

The present invention relates to improvement of a quantity-of-light adjusting device for adjusting passing light flux by opening and closing an opening with multiple quantity-of-light adjusting blades, and an exposure adjusting device for a camera.

2. Description of the Related Art

Hitherto, various types of devices having iris blades or shutter blades or the like for adjusting the quantity of light so that the exposure on a recording medium such as film or a CCD is a suitable level have been proposed, and many proposals have been made regarding the method for detecting the position (turning state) of the iris blades or shutter blades.

For example, with a known shutter device wherein light flux for photography is shielded or passed by turning of two shutter blades, a slit shape is provided near the tip of one of the two shutter blades, and the slit shape is passed over a sensor such as a photo-interrupter or the like, thereby detecting the position of the shutter blade, which is used for controlling exposure.

Also, Japanese Patent Laid-Open No. 2001-042382 discloses an arrangement configured of two sets of shutter blades, each set formed of two blades, and each set turning in opposite directions, wherein a slit shape is provided at the tips of the two shutter blades turning in the same direction with different rotating angles for the two shutter blades, so that signals at the time of the blades beginning to open can be detected multiple times, to be used for determining whether or not exposure trouble has occurred.

Further, Japanese Patent No. 2,627,168 and Japanese Patent No. 2,909,629 propose detecting an external shape edge face of one shutter blade with a photo-sensor or the like.

However, attempting to detect the position of a shutter blade with a slit shape formed on one shutter blade as described above results in detection of the shutter being limited to an extremely limited range where the shutter blade begins to move, and in the event that the shutter blade is to be detected from the beginning of motion to the fully-open position, either multiple slit shapes must be formed or multiple detecting means must be provided, resulting in increased size of the shutter blades, which in turn increases the size of the shutter device, increases costs, and so forth.

With the exposure adjusting device disclosed in Japanese Patent Laid-Open No. 2001-042382, only signals near where the shutter blade begins to move can be obtained, and attempting to detect the position of the blade from the beginning of motion to the fully-open position increases the size of the shutter blades, which increases the size of the shutter device and increases costs.

Also, with the exposure adjusting device disclosed in Japanese Patent Laid-Open No. 06-281995, there is no need to provide special shapes such as slits or the like to the shutter blades, so the device does not become oversized, but there is the need to subject the shutter blades to magnetic electroplating, and the further magnetization, which inevitably leads to increased costs.

SUMMARY OF THE INVENTION

It is an object of the present invention to provide a small and highly-precise quantity-of-light adjusting device and exposure adjusting device for a camera, without increased size or costs of the device.

According to one aspect of the present invention, a quantity-of-light adjusting device comprises a first quantity-of-light adjusting blade and a second quantity-of-light adjusting blade which move to adjust quantity of light, and a detecting member which detects that the first quantity-of-light adjusting blade is at a predetermined location while also detecting that the second quantity-of-light adjusting blade has moved to the predetermined location following the first quantity-of-light adjusting blade moving from the predetermined location.

The quantity-of-light adjusting device may also further comprise a base plate with an opening formed therein, with the first quantity-of-light adjusting blade turning on a first shaft provided on the base plate, and the second quantity-of-light adjusting blade turning on a second shaft provided on the base plate, in a direction opposite the turning of the first quantity-of-light adjusting blade.

Also, the detecting member may output a first signal indicating the position of the first quantity-of-light adjusting blade in a state wherein the first quantity-of-light adjusting blade and the second quantity-of-light adjusting blade close the opening, before the quantity-of-light adjusting blades move and light flux begins to pass through the opening, and also output a second signal indicating the position of the second quantity-of-light adjusting blade in a state wherein the quantity-of-light adjusting blades have further turned and the opening is fully open.

The detecting member may be a photo-sensor. Also, the first quantity-of-light adjusting blade and the second quantity-of-light adjusting blade may each have a pair of blades.

According to another aspect of the present invention, a quantity-of-light adjusting device comprises: a first quantity-of-light adjusting blade and a second quantity-of-light adjusting blade which move to adjust quantity of light; a driving member for turning the first and second quantity-of-light adjusting blades in mutually opposite directions so as to change the diameter of an opening formed between the first quantity-of-light adjusting blade and the second quantity-of-light adjusting blade; and a detecting member which detects that the first quantity-of-light adjusting blade is at a predetermined location, while also detecting that the second quantity-of-light adjusting blade has been driven to the predetermined location by the driving member following the first quantity-of-light adjusting blade having been retracted from the predetermined location.

Further objects, features and advantages of the present invention will become apparent from the following description of the preferred embodiments (with reference to the attached drawings).

DESCRIPTION OF THE PREFERRED EMBODIMENTS

The following is a detailed description of the present invention, with reference to the drawings.

Figure 1:
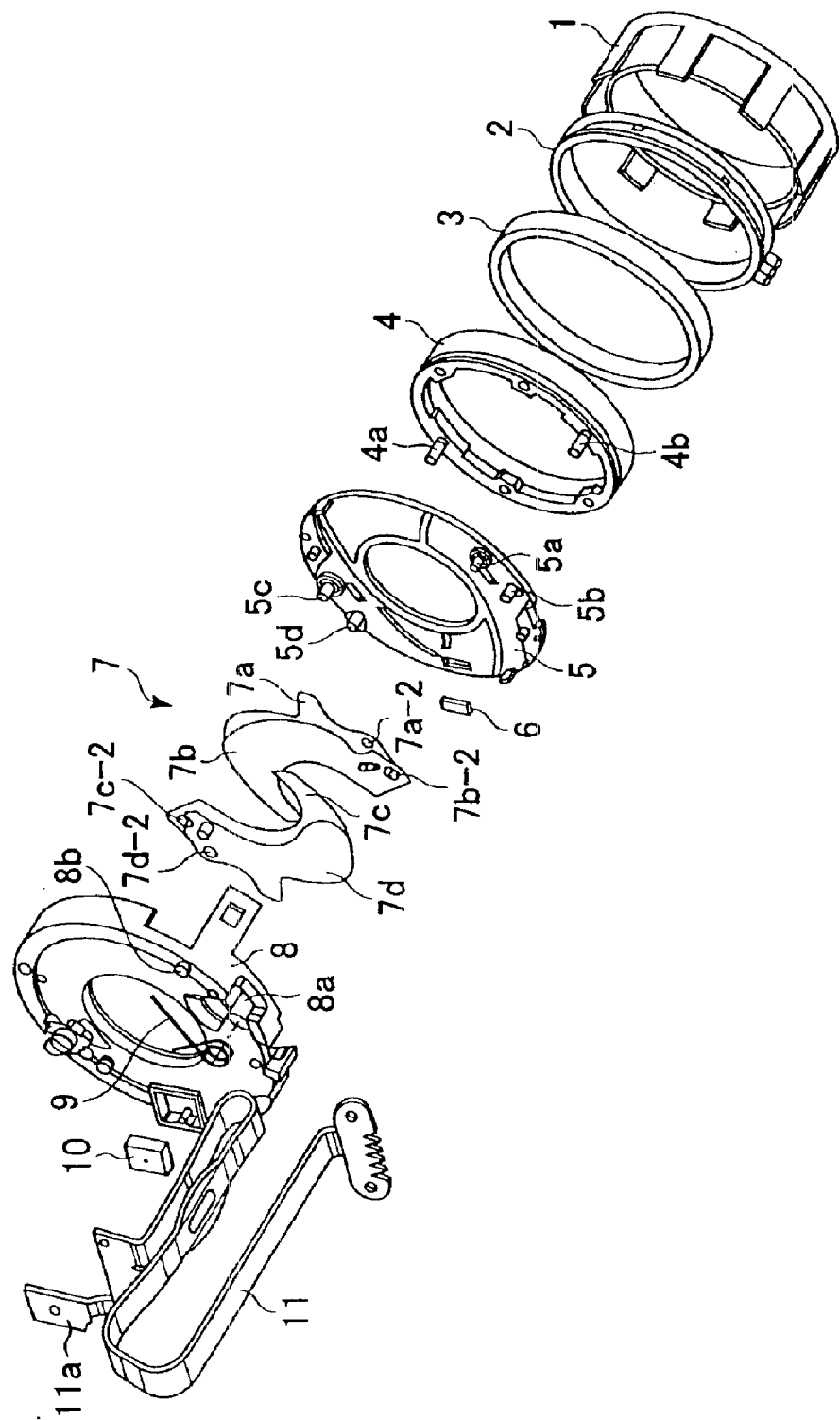
FIG. 1 is a disassembled perspective view illustrating an exposure adjusting device provided to a compact camera according to an embodiment of the present invention.
Figure 2:
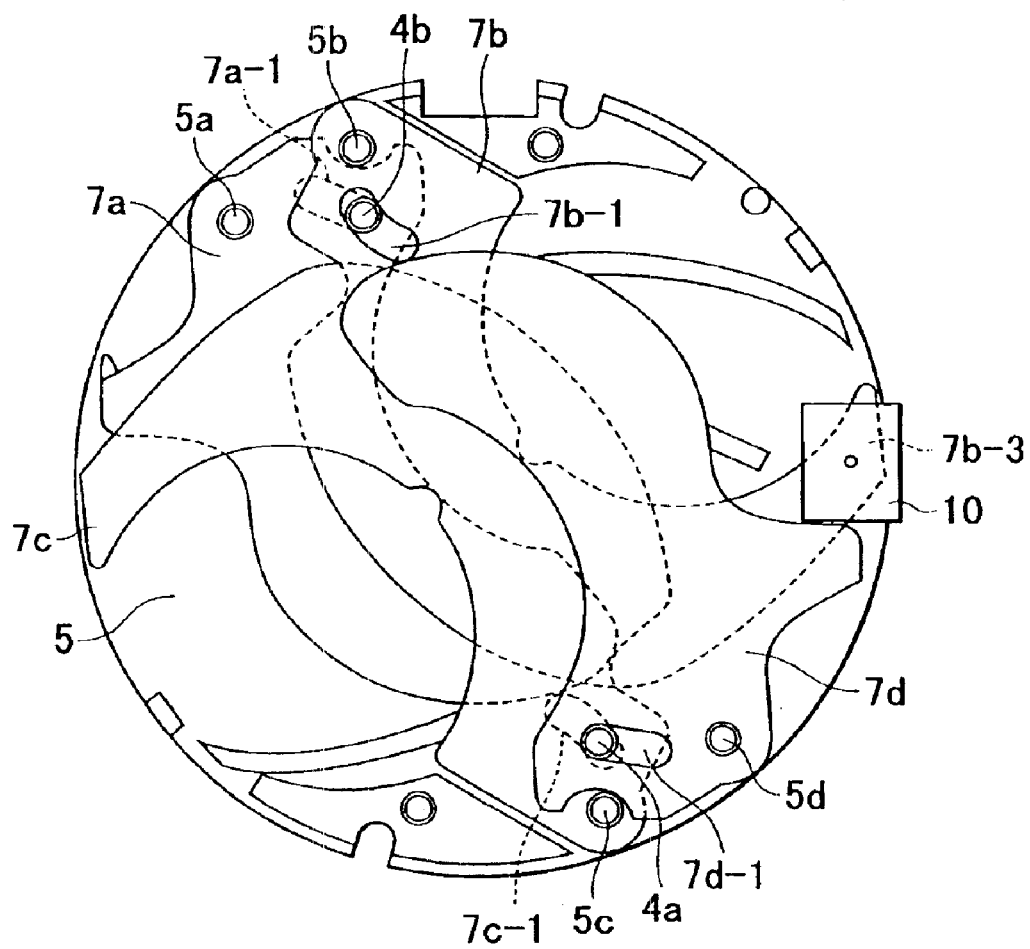
FIG. 2 is a plan view illustrating a closed state of the shutter blades provided to the exposure adjusting device shown in FIG. 1.
Figure 3:
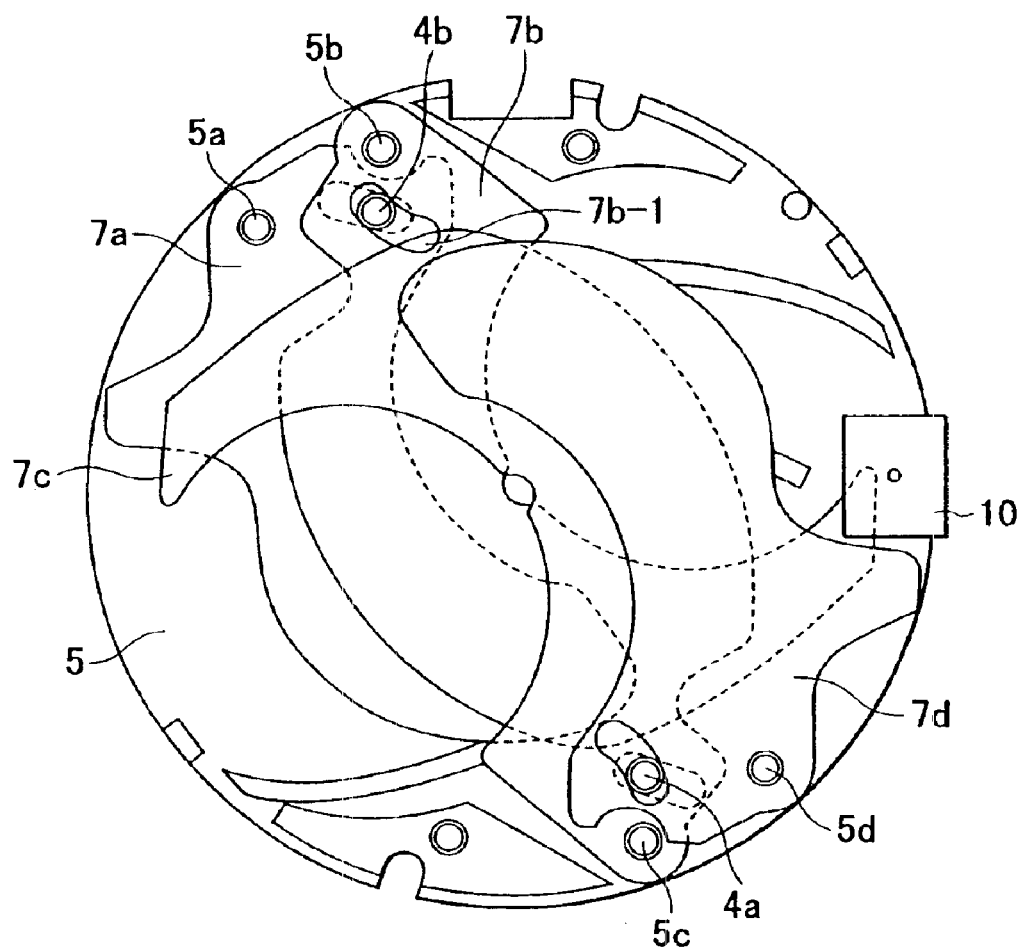
FIG. 3 is a plan view illustrating a pinhole state, wherein the shutter blades provided to the exposure adjusting device shown in FIG. 1 are slightly opened and the light flux for photography begins to pass.
Figure 4:
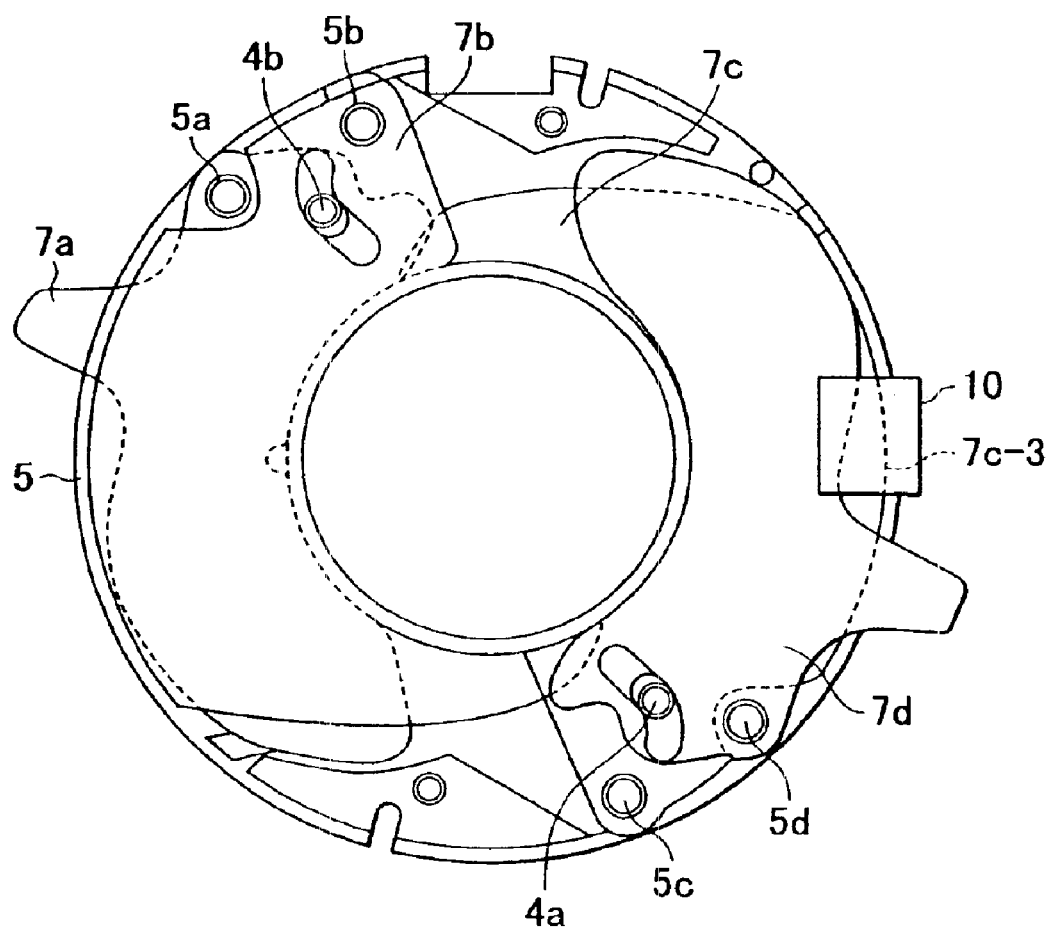
FIG. 4 is a plan view illustrating a state wherein the shutter blades provided to the exposure adjusting device shown in FIG. 1 are fully opened.
Figure 5:
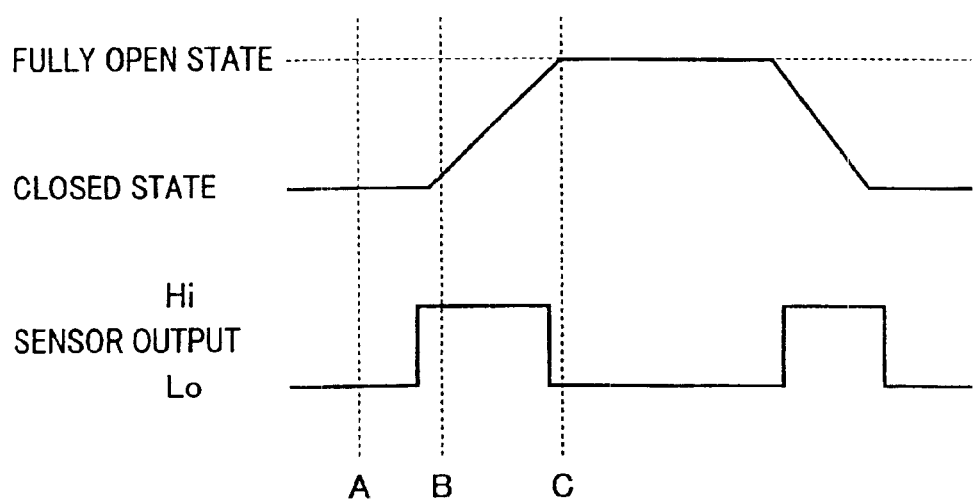
FIG. 5 is a diagram illustrating the timing of shutter blade signals and opening of the shutter shown in FIGS. 2 through 4.

FIGS. 1 through 5 are drawings relating to an embodiment of the present invention, wherein FIG. 1 is a disassembled perspective view illustrating an exposure adjusting device provided to a compact camera according to an embodiment of the present invention, FIG. 2 is a plan view illustrating a closed state of the shutter blades provided to the exposure adjusting device shown in FIG. 1, FIG. 3 is a plan view illustrating a state wherein the shutter blades provided to the exposure adjusting device shown in FIG. 1 are slightly opened and the light flux for photography begins to pass, FIG. 4 is a plan view illustrating a state wherein the shutter blades provided to the exposure adjusting device shown in FIG. 1 are fully opened, and FIG. 5 is a diagram illustrating the timing of shutter blade position signals and opening of the shutter shown in FIGS. 2 through 4.

The exposure adjusting device according to an embodiment of the present invention is an iris also serving as a shutter (a so-called "lens shutter") disposed within a photography lens group, and is arranged such that the light flux for photograph is allowed to pass or is shielded by rotational movement of shutter blades 7a, 7b, 7c, and 7d, which each have different rotation centers, in order to give priority to reduction in size. The shutter blades 7a and 7b both turn in the same direction, and the shutter blades 7c and 7d both turn in the direction opposite to that of the shutter blades 7a and 7b.

A shutter base plate 5 which holds the four shutter blades 7 (7a through 7d) has four rotating shafts 5a, 5b, 5c, and 5d, for the shutter blades 7 formed there upon, with the rotating shafts 5a, 5b, 5c, and 5d engaging round hole portions 7a-2, 7b-2, 7c-2, and 7d-2, of the shutter blades 7a, 7b, 7c, and 7d, such that the shutter blades 7 rotate on the rotating shafts 5a through 5d.

An actuator for the exposure adjusting device according to the present embodiment is formed in the shape of a ring, and a rotor 4 is provided for driving the shutter blades 7. This rotor 4 is formed of a plastic magnet, and is magnetized alternately N-pole and S-pole in the circumferential direction at equal intervals. Reference numeral 3 denotes a coil wound in a cylindrical manner, fastened to a bobbin 2. The coil 3 and bobbin 2 are fixed to a yoke 1. The yoke 1 is formed of a material with high magnetic permeability, such as pure iron or Permalloy, and guides magnetic flux generated by applying electric current to the coil 3, to the rotor 4 in an effective manner. Applying electric current to the coil 3 rotates the rotor 4 around the photography optical axis, and changing the direction of the electric current applied to the coil 3 changes the direction of rotation of the rotor 4.

Driving pins 4a and 4b are integrally formed to the rotor 4, for turning the shutter blades 7a through 7d. The driving pins 4a and 4b are each inserted into slits 7a-1 and 7b-1, and 7c-1 and 7d-1 of the shutter blades, across the shutter base plate 5. Rotating the rotor 4 causes the driving pins 4a and 4b to slide while pushing the slits 7a-1 and 7b-1, and 7c-1 and 7d-1, thereby turning each shutter blade on the rotational center thereof, such that the light flux for photograph is allowed to pass or is shielded.

Reference numeral 8 denotes a shutter cover for restricting play in the photography optical axial direction of the four shutter blades 7 along with a shutter bottom plate, and also holding the shutter blades 7. Reference numeral 9 is a torsion spring for returning the shutter blades 7 from an open state to a shut state. The torsion spring 9 is attached to a spring peg 8a of the shutter cover 8, with one arm thereof coming into contact with a spring stopper 8b of the shutter cover 8, and the other arm hitched onto the driving pin 4b of the rotor 4, so as to always press in the direction of closing the shutter blades 7.

Reference numeral 10 denotes a photo-reflector serving as detecting means for detecting the turning state of the shutter blades 7b and 7c out of the shutter blades 7a through 7d (i.e., whether or not a predetermined shape portion is at an opposing position), positioned on the turning path of the blade tip portion 7b-3 (see FIG. 2) turning with the maximum radius from the center of rotation of the shutter blade 7b. The photo-reflector 10 is electrically connected to an attachment portion 11a of a flexible printed board 11. Both end portions of the coil 3, not shown in the drawings, are also connected to the flexible printed board 11, so as to be electrically connected to the camera main unit side. Reference numeral 6 denotes a reflecting plate for reflecting infrared light cast from a light emitting unit (not shown) of the photo-reflector 10 so as to be received at a photo-receptor (not shown) of the photo-reflector 10.

In the event that the reflecting plate 6 and the photo-reflector 10 are shielded by the shutter blade 7b, the infrared light cast from the light emitting unit (not shown) of the photo-reflector 10 is reflected off of the shutter blade 7b with low reflectivity and is cast into the photo-receptor (not shown) of the photo-reflector 10, so the level of the signal output from the photo-reflector 10 is low (the Lo signal in FIG. 5). On the other hand, in the event that the shutter blade 7b is retracted from the gap between the reflecting plate 6 and the photo-reflector 10, the infrared light reflected off of the reflecting plate 6 is cast into the photo-receptor (not shown) of the photo-reflector 10, so the level of the signal output from the photo-reflector 10 is high (the Hi signal in FIG. 5).

Next, the relation between the opening-closing actions of the shutter blades 7 and the blade position signals will be described. FIG. 2 is a plan view showing the shutter blades in a closed state, viewed from the rear side of the camera. The photography light flux is completely shielded in this closed state, and the photo-reflector 10 is shielded by the blade tip portion 7b-3 of the shutter blade 7b, so the signal output from the photo-reflector 10 is a Lo signal (the state in A in FIG. 5).

In this state, upon electric current being applied to the coil 3 and the rotor 4 starting to rotate, the shutter blades 7 turn as shown in FIG. 3 and photography light flux begins to pass. Immediately before the photography light flux begins to pass, the blade tip portion 7b-3 of the shutter blade 7b moves away from the photo-receptor (not shown) of the photo-reflector 10, so the photo-reflector 10, is in a non-shielded state, wherein the infrared light projected from the photo-reflector 10 is reflected off of the reflecting plate 6 and is cast into the photo-receptor of the photo-reflector 10.

Accordingly, the signal output from the photo-reflector 10 changes from a Lo signal to a Hi signal (the state in B in FIG. 5; generating the first signal).

Further applying electric current to the coil 3 further turns the shutter blades 7, until the shutter aperture is fully opened, as shown in FIG. 4. Immediately before the shutter aperture becomes fully open, the perimeter edge portion 7c-3 of the shutter blade 7c shields the photo-receptor of the photo-reflector 10. At this time, the signal output from the photo-reflector 10 changes from the Hi signal to the Lo signal (the state in C in FIG. 5; generating the second signal).

Also, in the event that the shutter time is long, once the shutter is completely opened the amount of electric current applied to the coil 3 is reduced to a level such that the rotational torque of the rotor 4 is not smaller than the pressing force of the torsion spring 9, in order to conserve electricity and to prevent overheating of the coil 3 due to the electric current being applied. With the present embodiment, the electric current is reduced to approximately ⅓ of that applied when opening the shutter.

In the event of returning the shutter blades 7 from the fully opened state (the state in FIG. 4) to the closed state (the state in FIG. 2), the torsion spring 9 is strung so as to press the shutter blades 7 in the closing direction, so cutting off the electric current being applied to the coil 3 in the direction for opening the shutter causes the shutter blades 7 to automatically turn in the closing direction and stop, but the shutter blades 7 should be closed as fast as possible in order to improve exposure precision and to handle high shutter speeds, so electric current is applied to the coil 3 at this time as well for a predetermined period, but in the direction for closing.

Known constant-current driving is used with the exposure adjusting device of the camera according to the present embodiment, and the current value in the opening direction to be applied to the coil 3 is determined such that the time from the first signal generated immediately before the photography light flux begins to pass (the state B in FIG. 5; i.e., the state in FIG. 3) till the second signal generated immediately before the photography light flux passes unrestrictedly (the state A in FIG. 5; i.e., the state in FIG. 2), is a predetermined time length. Also, the driving current value is corrected according to temperature, since the coil resistance, magnetic density of the magnet, friction resistance of the driving unit, etc., change according to temperature, thereby applying electric current to the coil 3 such that the shutter time is unchanged.

With actual shutter control, time is measured from the first signal (the state B in FIG. 5; i.e., the state in FIG. 3), and following a predetermined amount of time, electric current in the closing direction is initiated to close the shutter blades 7, so that control can be made for high-speed shutter times wherein the shutter blades 7 do not open all the way, as well.

Also, in the event of photography using a strobe, the amount of time from the shutter completely opening (the state A in FIG. 5; i.e., the state in FIG. 2) is measured, and following a predetermined amount of time, electric current in the closing direction is initiated to close the shutter blades 7.

According to the present embodiment as described above, the following advantages can be had.

1) The exposure adjusting device comprises a photo-reflector 10 (and reflecting plate 6) serving as detecting means for detecting that predetermined shape portions (7b-3 and 7c-3) of a first shutter blade (7b) and a second shutter blade (7c) of multiple shutter blades are at a detection position, and outputting signals indicating the open/close state of the multiple shutter blades 7a through 7d, wherein, following the multiple shutter blades 7a through 7d beginning to turn, upon detecting that the predetermined shape portion of the first shutter blade which had been positioned at the detection range is no longer at the detection range due to the rotating thereof, the photo-reflector 10 outputs a first signals indicating that the multiple shutter blades are in a state immediately before the light flux begins to pass through the aperture (making transition from the state in FIG. 2 to the state in FIG. 3), and upon detecting that the turning has further progress and that the predetermined shape portion of the second shutter blade which had not been positioned in the detection range is now positioned in the detection range, outputs a second signal indicating that the multiple shutter blades are in the state immediately before the aperture is completely opened and the light flux passes through unrestricted (the state in FIG. 4).

Accordingly, blade position signals of the pinhole position and fully opened position of the shutter aperture can be obtained without adding shapes such as slits to the shutter blades as with conventional arrangements, and thus, a small and precise exposure adjustment device can be provided without increasing manufacturing costs.

2) Making the turning direction of the first and second shutter blades to be mutually different does away with the need to provide special shapes for signal detection to the shutter blades, thereby reducing the size of the exposure adjustment device.

3) Disposing the photo-reflector 10 at a position at the generally maximum radius from the center of rotation of the first shutter blade and on the track of the predetermined shape portion thereof allows signals to be detected at a position with the movement of the shutter blade is great, thereby improving detection precision thereof.

4) Detecting the passage of the predetermined shape portion (perimeter edge face) of the first and second shutter blades with the photo-reflector 10 (i.e., detecting that the position thereof is within the detecting range) outputs the first and second signals, so signals indicating the blade position can be readily obtained without providing any special shapes such as slits or the like to the shutter blades.

5) Using a photo-electric converting element such as the photo-reflector 10 as the position detecting means allows the position of the shutter blades to be detected with a simple and relatively inexpensive configuration.

Note that while the above embodiment describes an example of application to a camera exposure adjusting device, the present invention is by no means restricted to such, and it is needless to say that the present invention may be applied to other optical devices having quantity-of-light adjusting functions.

Also, while an example having four shutter blades has been illustrated, the same advantages can be had with a configuration having at least two shutter blades, equivalent to the shutter blades 7b and 7c. However, it should be noted that in this case, the two shutter blades must be formed so as to be capable of completely shielding the aperture when in the closed state shown in FIG. 2. Also, in the event of using three blades, an arrangement can be made wherein the turning axes thereof are disposed 120° apart, with the relation between two of the three shutter blades and the detecting means being such as described in the embodiment.

Also, while the embodiment has been described with reference to an example using a photo-reflector 10 as the detecting means, similar advantages can be obtained with similar configurations using other photo-electric converting devices, such as photo-interrupters or the like.

Further, detecting means such as disclosed in Japanese Patent Laid-Open No. 06-281995, wherein magnetic portions are formed with multiple N-poles and S-poles alternately arrayed on a portion of the shutter blades by magnetic electroplating, and the opening/closing state of the multiple shutter blades (i.e., the opening/closing state of the aperture) is detected by the relation between the magnetic portions and a hall element, can be used to realize a small-size device, although the manufacturing cost is higher than that of the above-described embodiment.

The present invention thus realizes a small and highly-precise quantity-of-light adjusting device and exposure adjusting device for a camera, without increased size or costs of the device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A quantity-of-light adjusting device, comprising:

a first quantity-of-light adjusting blade and a second quantity-of-light adjusting blade which move to adjust quantity of light; and a detecting member which detects that said first quantity-of-light adjusting blade is at a predetermined location, and which also detects that said second quantity-of-light adjusting blade has moved to the predetermined location following said first quantity-of-light adjusting blade moving from the predetermined location, wherein when said second quantity-of-light adjusting member has moved to the predetermined location following said first quantity-of-light adjusting blade moving from the predetermined location, an opening through which the light passes is fully open.

2. A quantity-of-light adjusting device according to claim 1, wherein when said first quantity-of-light adjusting blade is at the predetermined location, the opening through which the light passes is closed.

3. A quantity-of-light adjusting device comprising:

a first quantity-of-light adjusting blade and a second quantity-of-light adjusting blade which move to adjust quantity of light;

a driving member which moves said first and second quantity-of-light adjusting blade in mutually different directions so as to change the size of an opening formed between said first quantity-of-light adjusting blade and second quantity-of-light adjusting blade; and a detecting member which detects that said first quantity-of-light adjusting blade is at a predetermined location, and which also detects that said second quantity-of-light adjusting blade has been driven to the predetermined location by said driving member following said first quantity-of-light adjusting blade having been retracted from the predetermined location.

* * * * *

UNITED STATES PATENT AND TRADEMARK OFFICE
CERTIFICATE OF CORRECTION

PATENT NO. : 6,904,235 B2
DATED : June 7, 2005
INVENTOR(S) : Nobuhiro Fujinaga

It is certified that error appears in the above-identified patent and that said Letters Patent is hereby corrected as shown below:

Column 3,
Line 44, "there upon" should read -- thereupon --.

Column 6,
Line 8, "signals" should read -- signal --.
Line 34, "with" should read -- when --.

Signed and Sealed this

Fourth Day of April, 2006

JON W. DUDAS
*Director of the United States Patent and Trademark Office*